(12) United States Patent
McQuillan (10) Patent No.: US 11,768,497 B2
(45) Date of Patent: Sep. 26, 2023

(54) VEHICLE CONTROL SYSTEM AND METHOD

(71) Applicant: Transportation IP Holdings, LLC, Norwalk, CT (US)

(72) Inventor: Edward McQuillan, Lisle, IL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 342 days.

(21) Appl. No.: 17/145,825

(22) Filed: Jan. 11, 2021

(65) Prior Publication Data

US 2021/0132616 A1    May 6, 2021

Related U.S. Application Data

(63) Continuation of application No. 15/411,949, filed on Jan. 20, 2017, now Pat. No. 10,901,426, which is a continuation-in-part of application No. 13/943,819, filed on Jul. 17, 2013, now abandoned.

(60) Provisional application No. 61/677,598, filed on Jul. 31, 2012.

(51) Int. Cl.
*G05D 1/02* (2020.01)
*G05D 1/00* (2006.01)
*G06Q 10/08* (2023.01)
*G06Q 10/0631* (2023.01)

(52) U.S. Cl.
CPC ......... *G05D 1/0217* (2013.01); *G05D 1/0022* (2013.01); *G05D 1/0027* (2013.01); *G05D 1/0219* (2013.01); *G05D 1/0276* (2013.01); *G06Q 10/06312* (2013.01); *G06Q 10/08* (2013.01); *G05D 2201/021* (2013.01)

(58) Field of Classification Search
CPC .. G05D 1/0217; G05D 1/0022; G05D 1/0027; G05D 1/0219; G05D 1/0276; G05D 2201/021; G06Q 10/06312; G06Q 10/08
See application file for complete search history.

(56) References Cited

U.S. PATENT DOCUMENTS 5,265,006 A * 11/1993 Asthana ................. G06Q 10/08
 705/7.22
6,363,323 B1 * 3/2002 Jones ..................... G08G 1/123
 342/357.395

* cited by examiner

*Primary Examiner* — Michael V Kerrigan
(74) *Attorney, Agent, or Firm* — THE SMALL PATENT LAW GROUP LLC; Philip S. Hof (57) ABSTRACT

A vehicle control system includes a first controller, a first communication unit, and a second controller and communication unit both on board a vehicle. The second controller is configured to generate first control signals for controlling the vehicle based at least in part on second control signals received by the second communication unit from the first communication unit. The first controller is configured to receive proximity signals relating to a geographic proximity between two or more designated transports. The transports are respective movements of material from respective first locations to respective second locations. The first controller is further configured to generate a control plan for the two or more transports based at least in part on the proximity signals, and generate the second control signals, for communication to the second controller for controlling completion of the two or more transports, based on the control plan.

20 Claims, 10 Drawing Sheets

VEHICLE CONTROL SYSTEM AND METHOD

CROSS-REFERENCE TO RELATED APPLICATIONS

This application is a continuation of U.S. patent application Ser. No. 15/411,949 (the "'949 Application"), filed on 20 Jan. 2017 and titled "Vehicle Control System". The '949 Application is a continuation-in-part of U.S. patent application Ser. No. 13/943,819, filed on 17 Jul. 2013, and claims priority from U.S. Patent Provisional Application No. 61/677,598, filed on 31 Jul. 2012. The entire disclosures of these applications are incorporated herein by reference.

BACKGROUND

Technical Field

Embodiments of the subject matter relate to control systems for controlling vehicles.

Discussion of Art

Material can be designated for transportation from one location to another. For example, excavated ore in a mine may be moved from one location to another. Similarly, cargo containers in a facility may need to be moved from first locations to different, second locations, for processing, routing, manufacturing, etc. Vehicles are frequently used to move such materials. However, a given location or area may have many possible routes, and many different materials that are to be moved from respective loading locations to respective destination locations. Randomly controlling vehicles to move the materials in such a context may be inefficient.

It may be desirable to have a vehicle control system that differs from existing vehicle control systems.

BRIEF DESCRIPTION

In an embodiment, a vehicle control system includes a first controller having at least one first processor, a first communication unit operatively coupled with the first controller, a second controller on board a vehicle (which is remote from the first controller and first communication unit) and having at least one second processor, and a second communication unit on board the vehicle and operatively coupled with the second controller. The first communication unit and the second communication unit are configured to wirelessly communicate with one another. The second controller is configured to generate first control signals for controlling one or more systems on board the vehicle based at least in part on second control signals that are received by the second communication unit from the first communication unit. The first controller is configured to receive proximity signals relating to a geographic proximity between two or more designated transports. The transports comprise respective movements of material from respective first locations to respective second locations. The first controller is further configured to generate a control plan for the two or more transports based at least in part on the proximity signals, and to generate the second control signals, for communication to the second controller for controlling completion of the two or more transports, based on the control plan that is generated.

In an embodiment, a vehicle control system includes a first controller having at least one first processor, and a first communication unit operatively coupled with the first controller. The first communication unit is configured to wirelessly communicate with a remote, second communication unit that is on board a vehicle and operatively coupled with a second controller on board the vehicle. The first controller is configured to receive proximity signals relating to a geographic proximity between two or more designated transports. The transports comprise respective movements of material from respective first locations to respective second locations. The first controller is further configured to generate a control plan for the two or more transports based at least in part on the proximity signals, and to generate control signals, for communication to the second controller for controlling one or more systems on board the vehicle for completion of the two or more transports, based on the control plan that is generated.

BRIEF DESCRIPTION OF THE DRAWINGS

Reference is made to the accompanying drawings in which particular embodiments are illustrated, as described in more detail in the description below, in which:

FIG. 6 is an illustration of a screenshot associated with vehicle control activity;

DETAILED DESCRIPTION

Embodiments of the inventive subject matter relate to methods and systems for vehicle control for movement of materials in an area (e.g., mine, transportation facility, or the like). Such systems may reduce travel time and/or travel distance for the movement of materials within the area. In particular, vehicles can receive control plans that assign transport(s) (movements of materials) based on a set of factors. Suitable factors may include proximity of a vehicle and a start location of the transport; types of vehicles or other equipment, health of vehicles or other equipment, remaining time left on a shift, type of material to be moved, and other prioritization factors. A geographic location of the vehicle can be utilized to assign transports in order to reduce a distance traveled for a transport or reduce a travel time for a transport. The transports and/or the transport control plan can be communicated for dynamic management of material transport and movement within an area.

In one embodiment, for example, a vehicle control system includes a first controller having at least one first processor, and a first communication unit operatively coupled with the first controller. The first communication unit is configured to wirelessly communicate with a remote, second communication unit that is on board a vehicle and operatively coupled with a second controller on board the vehicle. (By 'remote' in this example, it means the first controller and communication unit are not on board the vehicle.) The first controller is configured to receive proximity signals relating to a geographic proximity between two or more designated transports. The transports comprise respective movements of material from respective first locations to respective second locations, e.g., each transport indicates or represents that given material is to be transferred from a current location (of where the material is located) to a destination location. The proximity signals may originate from sensors, or from a data structure (stored in a memory) that correlates aspects of various transports (e.g., starting or ending locations) to geographic locations. (For example, for a first transport and a second transport having respective starting points of material to be moved, the data structure may indicate geographic locations of the starting points, which enables a calculation of the proximity.) The first controller is further configured to generate a control plan for the two or more transports based at least in part on the proximity signals, and to generate control signals, for communication to the second controller for controlling one or more systems on board the vehicle for completion of the two or more transports, based on the control plan that is generated. For example, the control signals may control movement of the vehicle (e.g., the one or more systems that are controlled include a vehicle traction/movement system) for moving material of the transports. The control plan may prioritize the transports, e.g., in regard to plural transports, the vehicle is directed first to the start point of the transports that is closest to a current location of the vehicle.

The term "material" refers to physical objects, such as packaged goods, construction members/objects, and excavated geologic objects (e.g., ore, rocks, coal). "Asset" is used synonymously. "Client asset" as used herein means a fixed asset or a mobile asset that is owned and/or operated by a client entity such as, for example, a railroad, a power generation company, a shipping company (e.g., land, sea, air, and/or a combination thereof), a mining equipment company, an airline, or another asset-owning and/or asset-operating entity. The terms "container" and "trailer" may be used interchangeably herein and refer to a storage medium configured to hold products, goods, or other shippable materials.

The term "vehicle" refers to a mobile machine that transports at least one of a person, people, or a cargo. For instance, a vehicle can be, but is not limited to being, a truck, an automobile, a rail car, an intermodal container, a locomotive, a marine vessel, a mining equipment, a construction equipment, and the like. The term "hostler" as used herein can be defined as a person or machine that operates a vehicle to perform the transport of a container or trailer from a first location to a second location. The terms "terminal", "yard", or "distribution center" may be used interchangeably herein and refer to a location and/or facility where products, goods, or other shippable materials are shipped into and subsequently shipped out of by drivers of shipping vehicles. "Area" refers more broadly to a space where material is moved between locations.

"Software" or "computer program" as used herein includes, but is not limited to, one or more computer readable and/or executable instructions that cause a computer or other electronic device to perform functions, actions, and/or behave in a desired manner. For example, a component can be a portion of hardware, a portion of software, and/or a combination thereof. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. The form of software may depend on, for example, requirements of a desired application, the environment it runs on, and/or the desires of a designer/programmer or the like. "Computer" or "processor" or "computer device" as used herein includes a programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory" or "memory," as used herein, refers to a storage device configured to store digital data or information which can be retrieved by a computer or processing element. "Controller," as used herein, refers to the logic circuitry and/or processing elements and associated software or program involved in controlling electronic and other devices (e.g., vehicles). The terms "signal", "data", and "information" may be used interchangeably herein and may refer to digital or analog forms.

Figure 1:
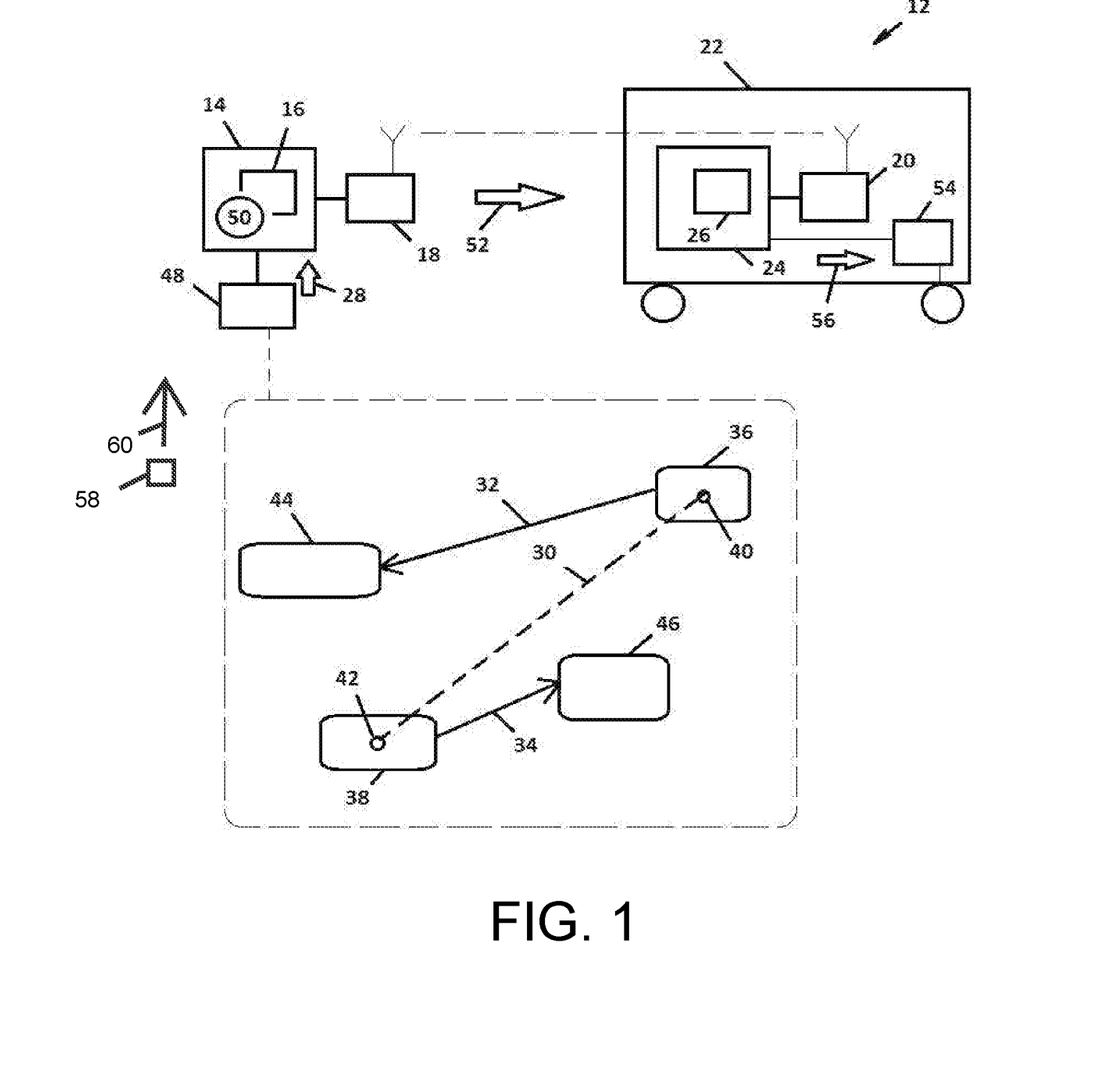
FIG. 1 is an illustration of an embodiment of a vehicle control system.

FIG. 1 illustrates a vehicle control system 12. The vehicle control system includes a first controller 14 having at least one first processor 16, and a first communication unit 18 operatively coupled with the first controller. The first communication unit is configured to wirelessly communicate with a remote, second communication unit 20 that is on board a vehicle 22 and operatively coupled with a second controller 24 on board the vehicle (which also has a processor 26). The first controller is configured to receive proximity signals 28 relating to a geographic proximity 30 between two or more designated transports 32, 34. As noted above, the transports comprise respective movements of material 36, 38 from respective first locations 40, 42 to respective second locations 44, 46. The proximity signals may come from a data structure 48 (stored in a memory) that correlates aspects of various transports (e.g., starting or ending locations) to geographic locations. The first controller is further configured to generate a control plan 50 for the two or more transports based at least in part on the proximity signals, and to generate control signals 52, for communication to the second controller for controlling one or more systems on board the vehicle for completion of the two or more transports, based on the control plan that is generated. For example, the control signals may control movement of the vehicle (e.g., the one or more systems that are controlled include a vehicle traction/movement system 54) for moving material of the transports. In addition, as should be appreciated, the second controller may be configured to generate additional or 'second' control signals 56 responsive to the 'first' control signals 52, for controlling the vehicle system(s), e.g. traction system 54. For example, the signals 52 may specify a first destination, and the signals 56 may control motor or engine output and/or steering to control the vehicle to the first destination.

Figure 2:
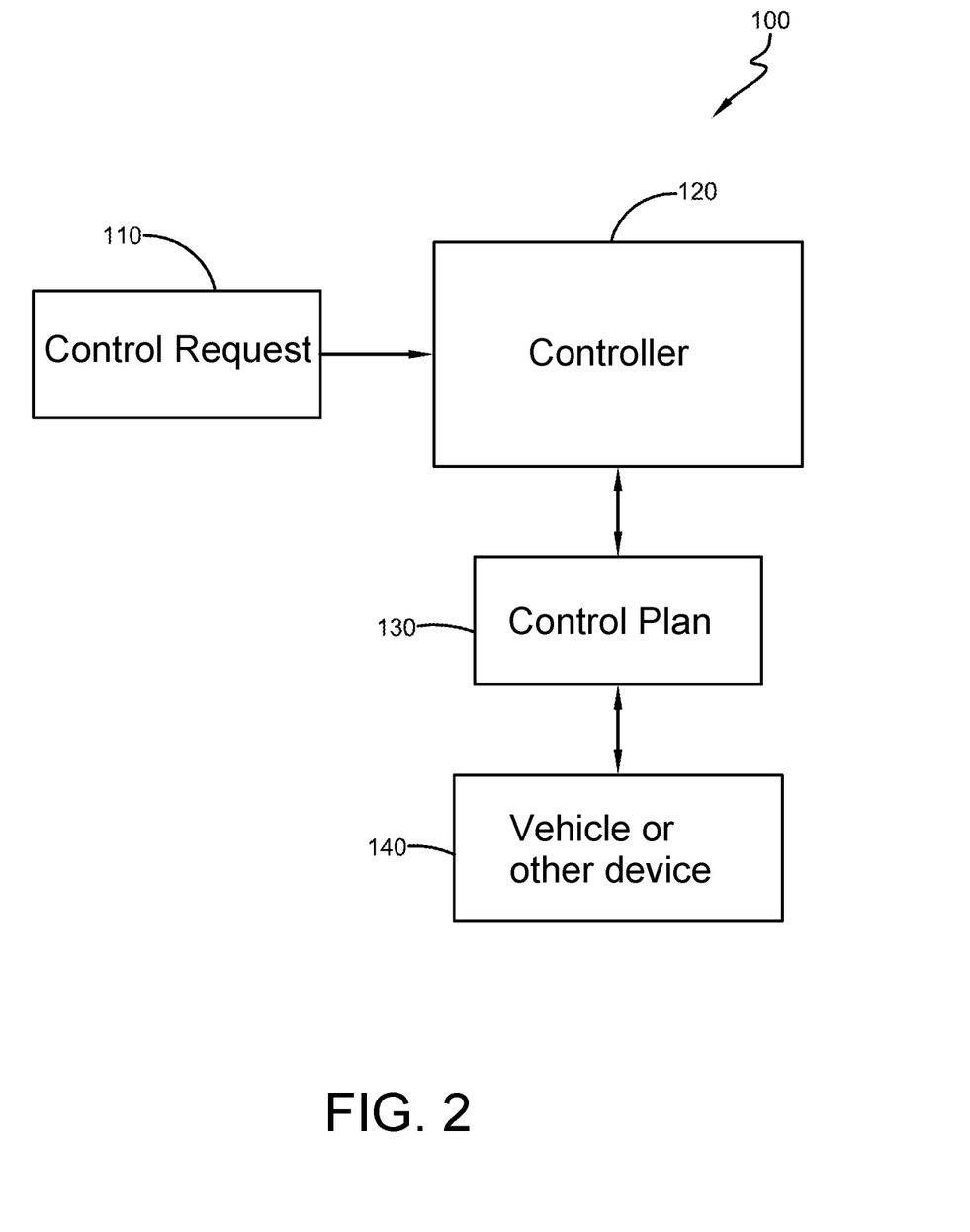
FIG. 2 is an illustration of an embodiment of a vehicle control system for controlling vehicles to reduce travel time and/or travel distance for the movement of materials within an area.

FIG. 2 is an illustration of an embodiment of a control system 100 (e.g., vehicle control system) for controlling transports to reduce travel time and/or travel distance for the movement of materials/assets within an area, e.g., distribution center. The system can include a system controller 120

(e.g., transport manager device) that prioritizes a control request 110 (e.g., work order) for a distribution center (or other area) in order to improve the transport of materials therein. The control request can be instructions related to a transport, wherein (as mentioned above) a transport is a movement of materials from a first location to a second location in the area. The controller can create a control plan 130 (e.g., transport itinerary) based upon the control request in which the control plan is assigned to a vehicle (or other equipment or to a worker) to handle transfer (e.g., complete the transport movement(s) from the first location to the second location) of material. The control plan is created and utilized to assign transfer of material in which a travel time for the material is reduced, a travel time for equipment or worker transferring the asset is reduced, or an amount of distance traveled for the material is reduced. The controller can be a separate device (as illustrated), incorporated into an existing system (e.g., computer system, hardware system, device, computer, among others), and/or a combination thereof.

The control request (e.g., work order) can be an instruction (e.g., written, digital, verbal, among others) in which material in the area (e.g., material/assets in the distribution center) is to be transported from a first location to a second location, i.e., the control request includes one or more transports. Again, the transports are respective movements of assets from respective first locations to respective second locations, e.g., the assets may be moved from the same first location to the same second location, or moved between different first and second locations. Additionally, the control request can include a pickup, a drop off, and/or a suitable combination thereof. Moreover, the transport that includes a movement from a first location to a second location can be a pickup of material, a drop off of material, and/or a suitable combination thereof. For instance, a movement from a first location to a second location can be a pickup (e.g., pickup at first location and drop off at second location), a drop off (e.g., drop off of an asset at second location from first location being present location) of material, or a combination of a pickup and drop off (e.g., drop off at first location and pickup at second location) of material. The control request can also include a suitable number of movements (e.g., pickups, drop offs, or a combination thereof).

In one embodiment, hostlers are shown what containers need to be extracted from the yard (e.g., distribution center) for dispatch (e.g., transport from a first location to a second location). The hostlers self-prioritize by working in teams and "own" rows or sections of the yard such that owning a row or section indicates responsibility for transport therein. Using an algorithm, tools, and/or screens, an embodiment may affect the efficiency of assigning transfer of assets. Some embodiments of the invention can bring containers from the distribution center to an outbound vehicle, location, train, on-road driver, among others. The controller (e.g., transport manager) can assign a sequence of work orders (that include transports of assets) through a device (e.g., handheld, in-dash console, among others) to decrease the travel time for each transport and/or decrease a distance traveled for the asset being transferred (e.g., thereby improving the retrieval and/or load up process). The transport manager further allows for re-sequencing (e.g., adjusting a prioritization, re-prioritizing, among others) in the case of a trigger event. Such triggers can include a task taking longer than an expected time, a change in customer prioritization, new hostler resources (e.g., equipment, tools, among others) being added/subtracted from availability, new work orders being added to the queue, an area specific event (discussed in more detail below), an amount of traffic, among others. Additionally, events may include one or more of rail network effects, weather, incoming container/trailer information, pricing events, value of assets, among others.

The distribution center can be a shipping terminal, a railroad intermodal terminal, a yard, a loading/unloading dock, or a location and/or facility where products, goods, or other shippable materials are shipped into and subsequently shipped out of by drivers of shipping vehicles. The containers or trailers containing the products, goods, or materials are processed in and out of the distribution center. Furthermore, the equipment can be a suitable mobile asset or vehicle that transfers assets from one location to another, wherein the equipment can include a load capacity. By way of example and not limitation, the transfer of an asset for a transport (e.g., a movement from a first location to a second location) can be handled or completed by a worker (e.g., employee, human, user, two or more workers, among others) or by equipment (e.g., vehicle, mobile machine, crane, machine, forklift, employee controlling the equipment, machine-controlled equipment, among others).

In embodiments, the system includes wireless communication devices (e.g., 18 and 20 in FIG. 1) operably interfacing to the system controller 120 and configured to communicate with other devices (e.g., via radio frequency communication, cellular, among others) operating within the distribution center or other area. Such other devices may be hand-held devices, in-console devices, devices used by inspectors, devices located in cranes or devices located on-site transportation vehicles within the distribution center, and are configured to communicate with the system controller. By way of example and not limitation, the system controller can communicate the control plan (e.g., transport itinerary) via the wireless communication. As discussed, the control plan can include instructions to complete two or more transports. Additionally, the control plan can include directions associated with the assigned two or more transports.

The control plan can be communicated to a vehicle or other device 140 via suitable medium. Suitable mediums can include wired, air, wireless, and/or a combination thereof. By way of example and not limitation, the device can receive the control plan with two or more prioritized transports for assignment, wherein the assignment can be indicated by a receipt by a particular device (e.g., a device for a worker, a device for equipment, among others). In another example, the assignment of the control plan can be designated by at least one of a name of a worker or an identification of a vehicle or other equipment. A suitable device can be a scanner, a barcode reader, a wireless device, a touchscreen, a camera, a smartphone, a laptop, a computer, a portable computing device, portable scanner, a mobile device, a portable digital assistant (PDA), a tablet, a web camera, a device incorporated into equipment, a device incorporated into a two-way communication device, handheld device, in-console devices, devices used by inspectors, devices located in cranes or devices located on-site transportation vehicles within the distribution center, among others.

Figure 3:
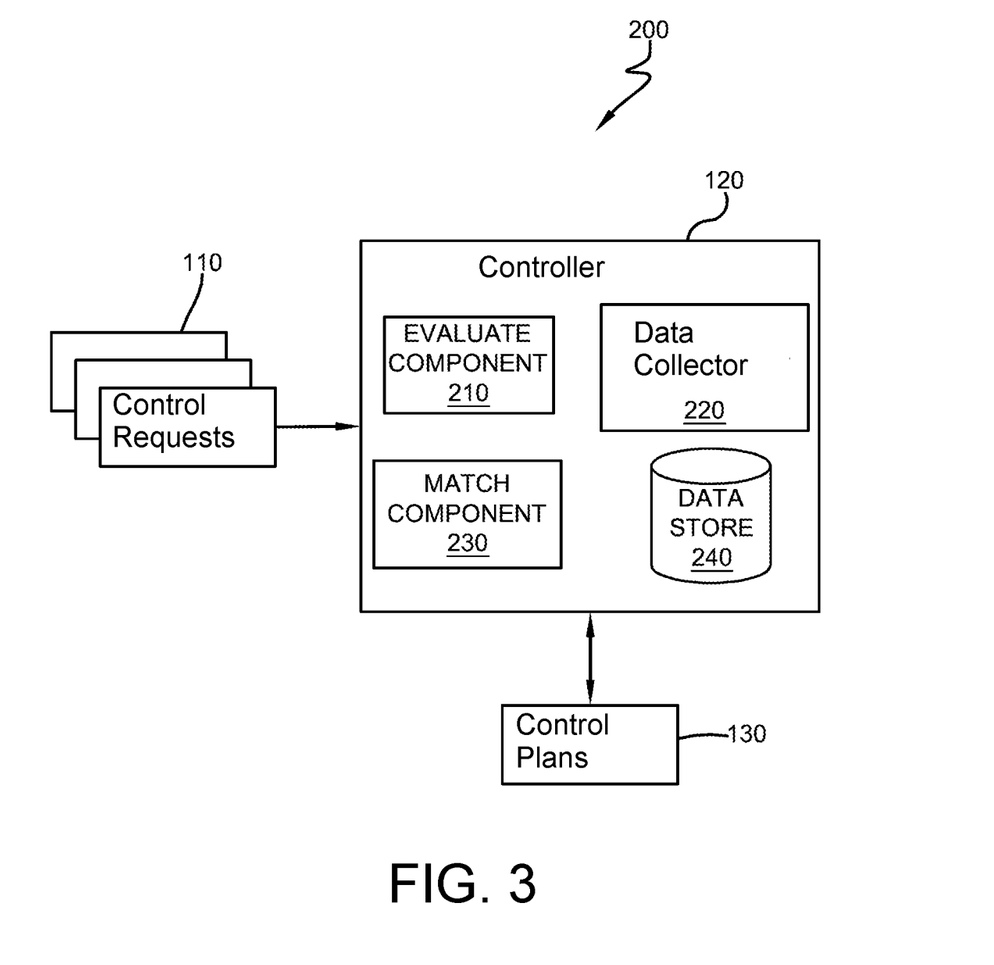
FIG. 3 is an illustration of an embodiment of a vehicle control system.

FIG. 3 is an illustration of a system 200 for managing transports of materials within a distribution center or other area. The system includes the system controller (e.g., transport manager) that prioritizes two or more transports associated with one or more control requests (e.g., work orders) in order to create the control plan (e.g., transport itinerary) that prioritizes the transports based on a geographic proximity between movements associated with each respective transport within such control request.

The system controller can further include an evaluation component 210 that analyzes the one or more control requests. For instance, the evaluation component can identify information from the control request, such as an asset, an asset destination (e.g., a location to drop off an asset, among others), an asset location (e.g., a location to pick up an asset, among others), a definition of the asset (e.g., contents, cost, vendor, manufacturer, customer, among others), an asset size, and an asset weight, among others.

The system controller further can include an area data collector 220 that can aggregate data associated with at least one of the area (e.g., distribution center), the vehicle or other equipment, and/or at least one worker. For instance, the data collector can aggregate geographic location data (e.g., worker geographic location, equipment geographic location, locations for pickups, locations for drop offs, destinations for movements of a transport, among others), area information (e.g., layout, landmark locations, routes, directions between locations, names of locations, identifications of landmarks, among others), worker information (e.g., worker schedule, worker name, worker identification, worker experience with equipment, worker real time geographic location, among others), vehicle or other equipment information (e.g., equipment type, equipment load capacity, equipment status, among others), and the like. In an embodiment, a real time geographic location can be defined as a geographic location of an entity (e.g., person, item, equipment, vehicle, etc.) based on an electronic device that communicates such geographic data, wherein the delay of electronic signals is taken into account to determine a real time location based on the device.

The system controller can further include a match component 230 that prioritizes two or more transports to package into the control plan. For instance, the match component can combine two or transports into the control plan for assignment to a vehicle for transfer (e.g., completion of the movement(s) of each transport). The combination can be such that the transports from the work orders are prioritized rather than handled in a sequential manner. For example, the match component can prioritize transports based upon a distance traveled for each movement such that a transfer will use the least amount of distance traveled. In another example, the match component can prioritize transports based upon a time for travel for each movement that a transfer of an asset uses. In still another example, the match component can prioritize transports of assets based upon the distance of the included movement(s) and a geographic location of a vehicle. The match component identifies efficient match making for two or more transports and vehicle based on reducing distance traveled for the asset, reducing time traveled for the asset, among others. The match component can further utilize suitable factors to prioritize transports, wherein the factors can be, for instance, proximity of the vehicle and a start location of the transport; types of equipment, health of equipment, remaining time left on a worker's shift, type of asset to be moved, type of vehicle the asset will be loaded onto, and other prioritization factors.

In another example, the match component can prioritize the two or more transports based on factors, such as traffic, an area specific event, an event trigger, and the like. For example, the match component can receive data related to an area specific event and include such condition in the prioritization and, in turn, assignment of transfer of an asset. An area specific event is an event occurring in an area or otherwise directly affecting operations in the area. For instance, the area specific event can be inoperable equipment, an unavailable worker, a construction of an area, a repair to an area, a power outage for the area, a repair to equipment, an emergency event in the area, a hazardous condition, and the like. In another example, the system can dynamically adjust prioritization of two or more transports based on traffic within the area. Thus, if the assignment of transports is such that the location of vehicles is within a proximate geographic area of the distribution center, the match component can re-adjust accordingly in order to update upcoming control requests as well as, or in the alternative, re-assign control requests to alleviate the traffic.

In one embodiment, the system controller stores information related to the system in a data store 240. The data store can include relationship information such as control request, area information, worker information, transport information, asset data, transfer status, completed control requests, assignment data, prioritization data, time/date information, duration of transport, distance of transport, geographic locations, equipment/vehicle information, equipment/vehicles associated with the distribution center, and/or a suitable combination thereof.

The data store can be, for example, either volatile memory or nonvolatile memory, or can include both volatile and nonvolatile memory. The data store of the subject systems and methods is intended to comprise these and/or other types of memory. The data store can be a server, a database, a hard drive, a solid-state drive, a pen drive, an external hard drive, a portable hard drive, cloud-based storage, and the like.

Figure 4:
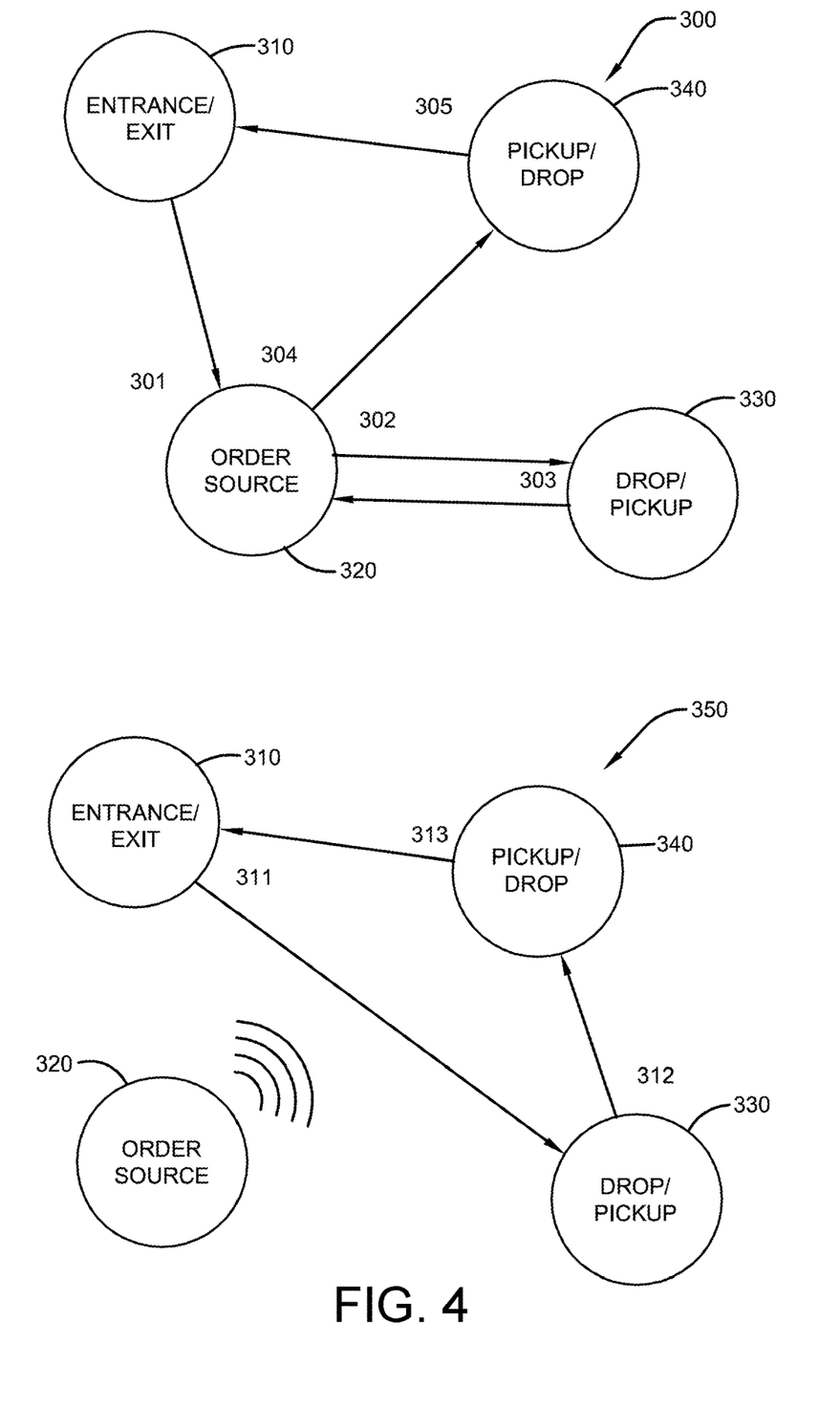
FIG. 4 illustrates a flow chart of an embodiment of a control plan.

FIG. 4 illustrates flow charts 300, 350 of an embodiment of a distribution center control plan (e.g., transport itinerary). FIG. 4 is discussed with the use of a vehicle to complete the transfer of an asset from one location to another. The completed transfer can be performed by equipment/vehicles, a user, and/or a combination thereof. The flow chart 300 illustrates a sequential control request (e.g., work order) flow in which a vehicle enters a distribution center from an entrance/exit 310. At reference numeral 301, the vehicle travels to an order source 320 to receive a control request (e.g., the order source can be a user, a hub, and the like). At reference numeral 302, the vehicle travels to drop off the asset or pick up the asset (e.g., DROP/PICKUP 330) based on the control request. At reference numeral 303, the vehicle travels back to the order source 320 to receive another control request from the order source 320. At reference numeral 304, the vehicle travels to pick up or drop off the asset (e.g., PICKUP/DROP 340). At reference numeral 305, the vehicle travels to the entrance/exit 310 to exit. Thus, the travel time and travel distance is based on reference numerals 301, 302, 303, 304, and 305.

The flow chart 350 illustrates a transport prioritization technique as provided by the systems 12, 100, 200, 400, and 800 utilizing at least the controller 120 (or 14). The order source 320 can broadcast and/or communicate the control requests to the vehicle(s) based upon prioritization provided by the system controller (not shown in this figure). At reference numeral 311, the vehicle enters the entrance/exit 310 and receives two or more transports that are assigned for transfer based on at least the movements of such transports as the vehicle is traveling. Once the control plan depicting the transports is received, the vehicle travels to drop off the asset or pickup an asset (e.g., DROP/PICKUP 330) at reference numeral 311. At reference numeral 312, the vehicle travels to pick up an asset or drop off the asset (e.g., PICKUP/DROP 340). At reference numeral 313, the vehicle travels to the entrance/exit 310 completing the transport itinerary. Thus, the distance traveled for the asset(s) and/or the travel time for the asset(s) is reduced in flow 350 versus the flow in 300.

Figure 5:
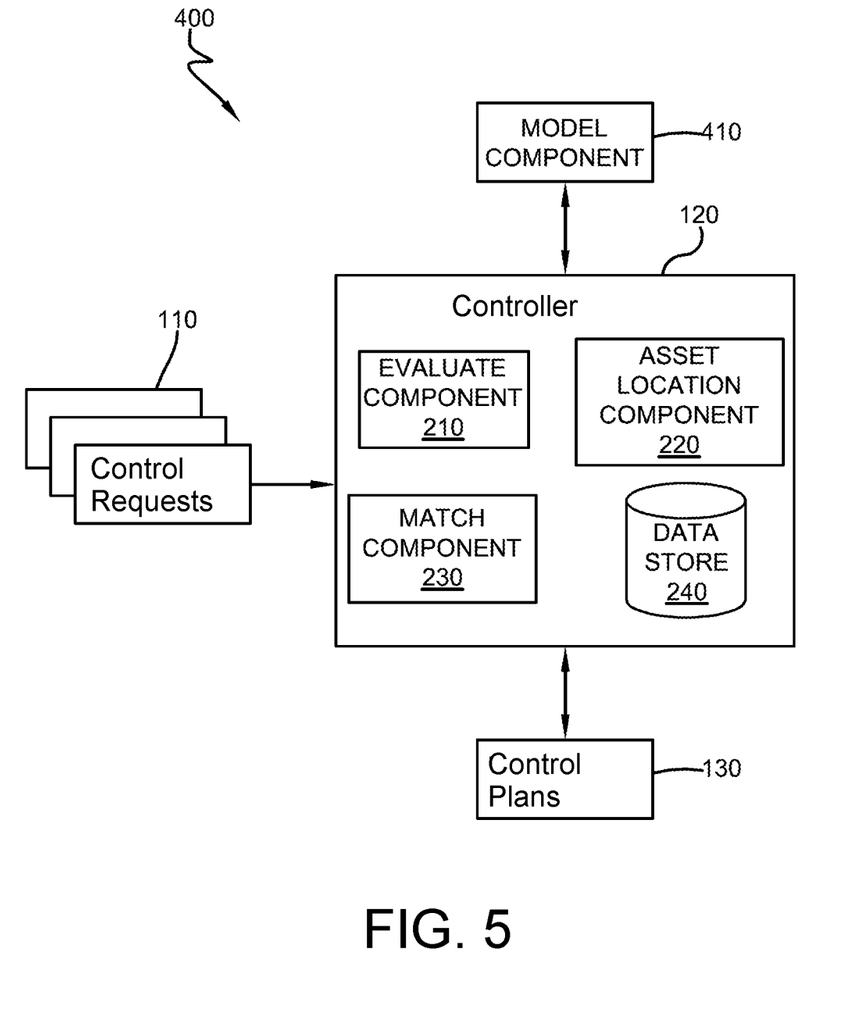
FIG. 5 is an illustration of an embodiment of a system for modeling an area or location and transports associated therewith.

FIG. 5 is an illustration of a system 400 for modeling a distribution center and transports associated therewith. The system can include a model component 410 that represents a distribution center as a model in order to accurately estimate and calculate prioritization of transports in order to reduce travel time of assets, travel distance of assets, and/or improve efficiency of workers and/or equipment.

Figure 7:
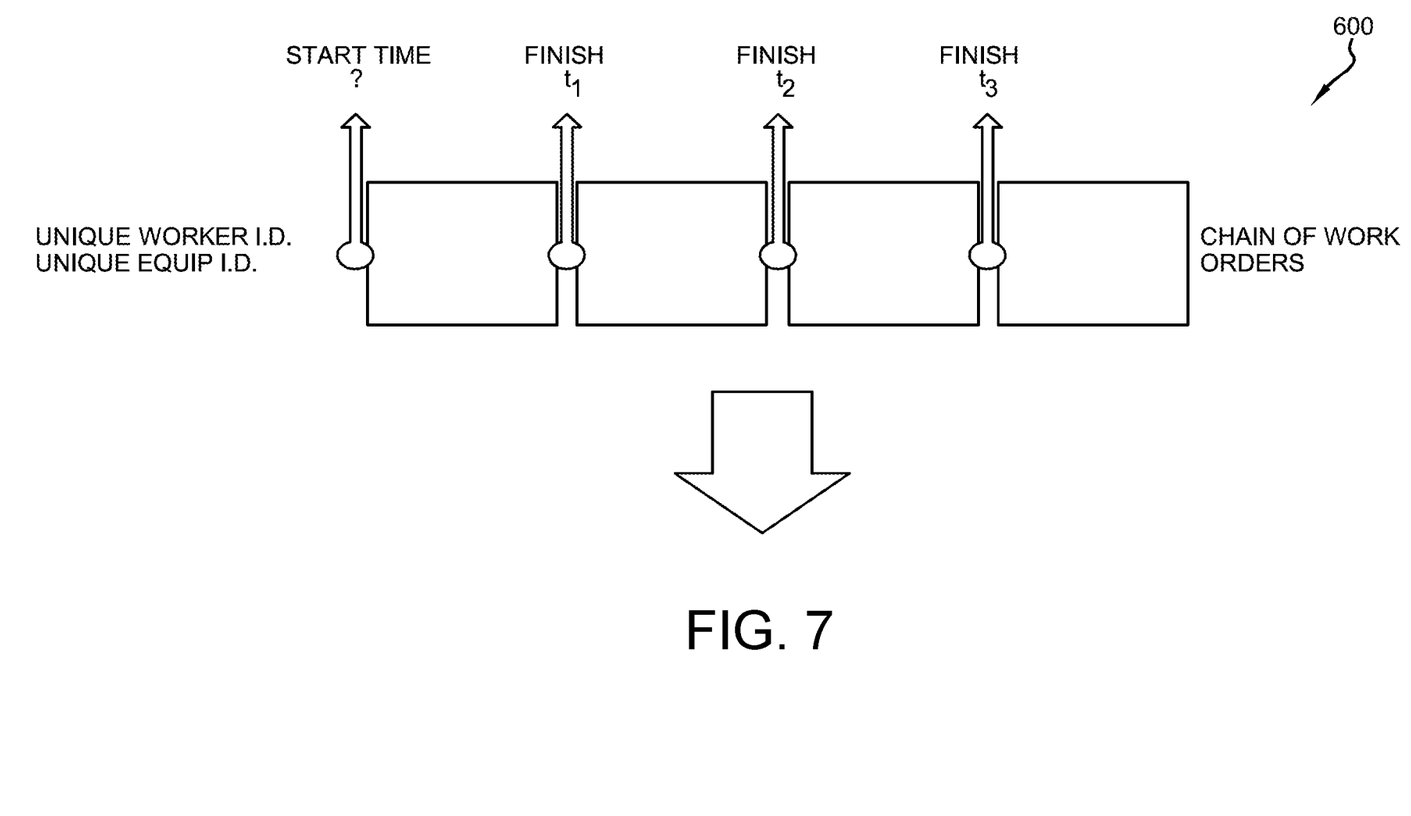
FIG. 7 is an illustration of graphs related to collecting data for vehicle control or otherwise.

By way of example and not limitation, the model component can employ the following techniques. The model component can utilize data from, for instance, a client, customer, a distribution center, among others (see FIG. 6 and a screenshot 500 as an example). Turning briefly to FIG. 7, graph 600 is illustrated. The model component can collate data for workers in the distribution center. Each worker can include a worker identifier and equipment can include an equipment identifier. Chain of control requests can be received. The chains can be qualified by having a same worker ID and equipment ID; having a time between tasks (e.g., time between can be three (3) minutes apart, but no more than thirty (30) minutes apart); and partial records can be filtered out (e.g., user can have a number of characters, start and end lots may not be empty, etc.). Each control request (after the first) can reference three waypoints: the position of the worker before starting the control request; the start location of the control request; and the end location of the control request. Waypoints can be unique place strings, x-y coordinates, GPS locations, GPS locations, and/or other coordinates that designate a geographic location in the distribution center.

Figure 8:
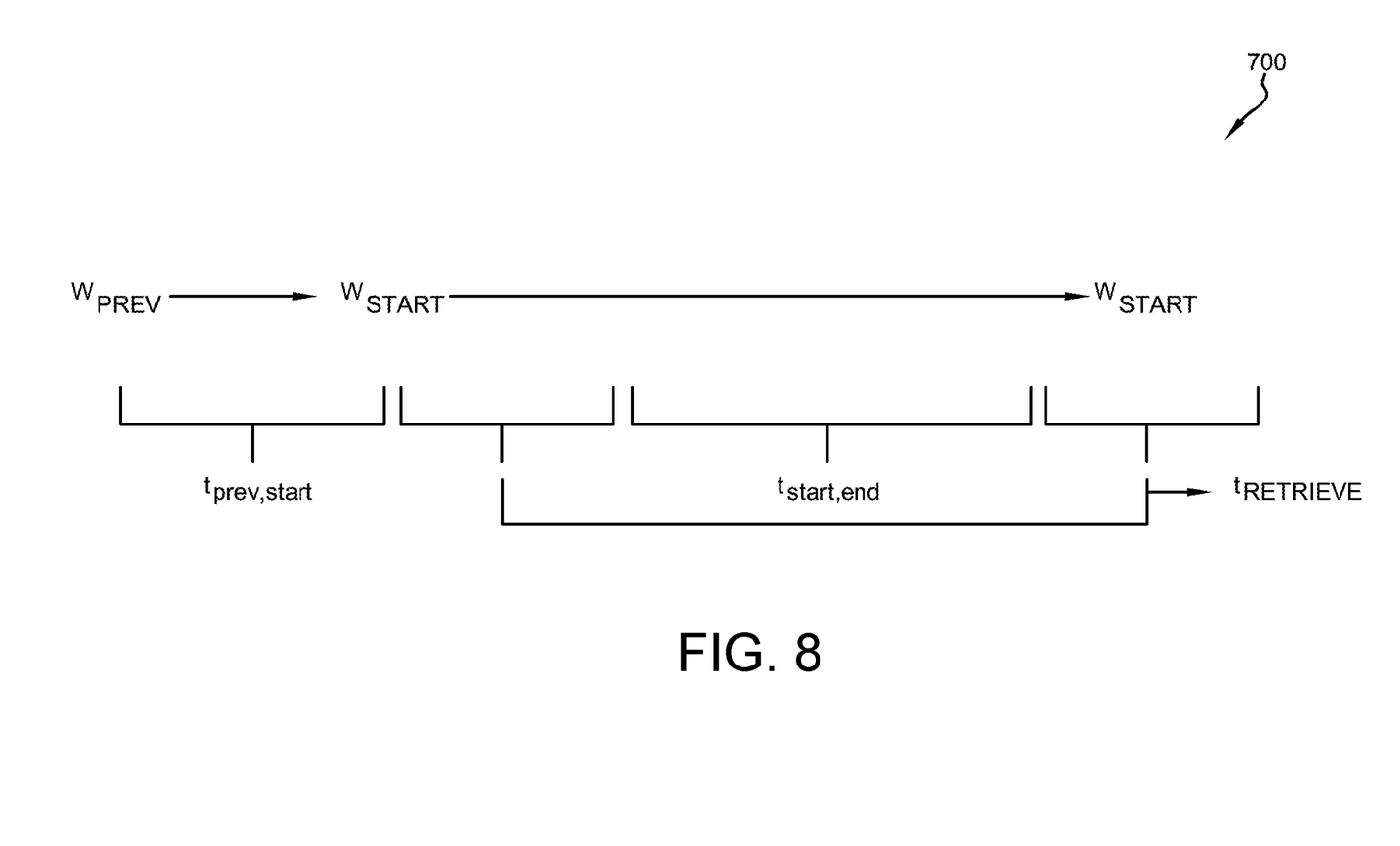
FIG. 8 is an illustration of a graph related to material transport requests.

Turning briefly to FIG. 8, a graph 700 is illustrated. The model component can create equations for travel time. Each control request in the chain can lead to one equation which references three (3) variables which creates, for instance, a sparse 0-1 matrix. The result can be an over-determined system, but possibly rank deficient, and/or poorly conditioned. The model component 410 can employ a sparse solution technique(s). Travel times can be resolved between waypoints. For instance, there can be n (n−1) entries if diagonal elements in a matrix are zero, where n is a positive integer.

The model component can provide a solution such as damped least squares (e.g., regularization). The model component indicates values can be distributed around an average, and may affect or improve conditioning of A and $A^T A$. This can solve the normal equations using conjugate gradient method: $A^T Ax = A^T b$. However, if values are outside of expected range, one embodiment of the system may increase the damping on those variables and re-solve. A complete travel matrix can be utilized. In another embodiment, an amount of trips can be regulated, and waypoints or locations can be restructured to increase system performance.

Figure 9:
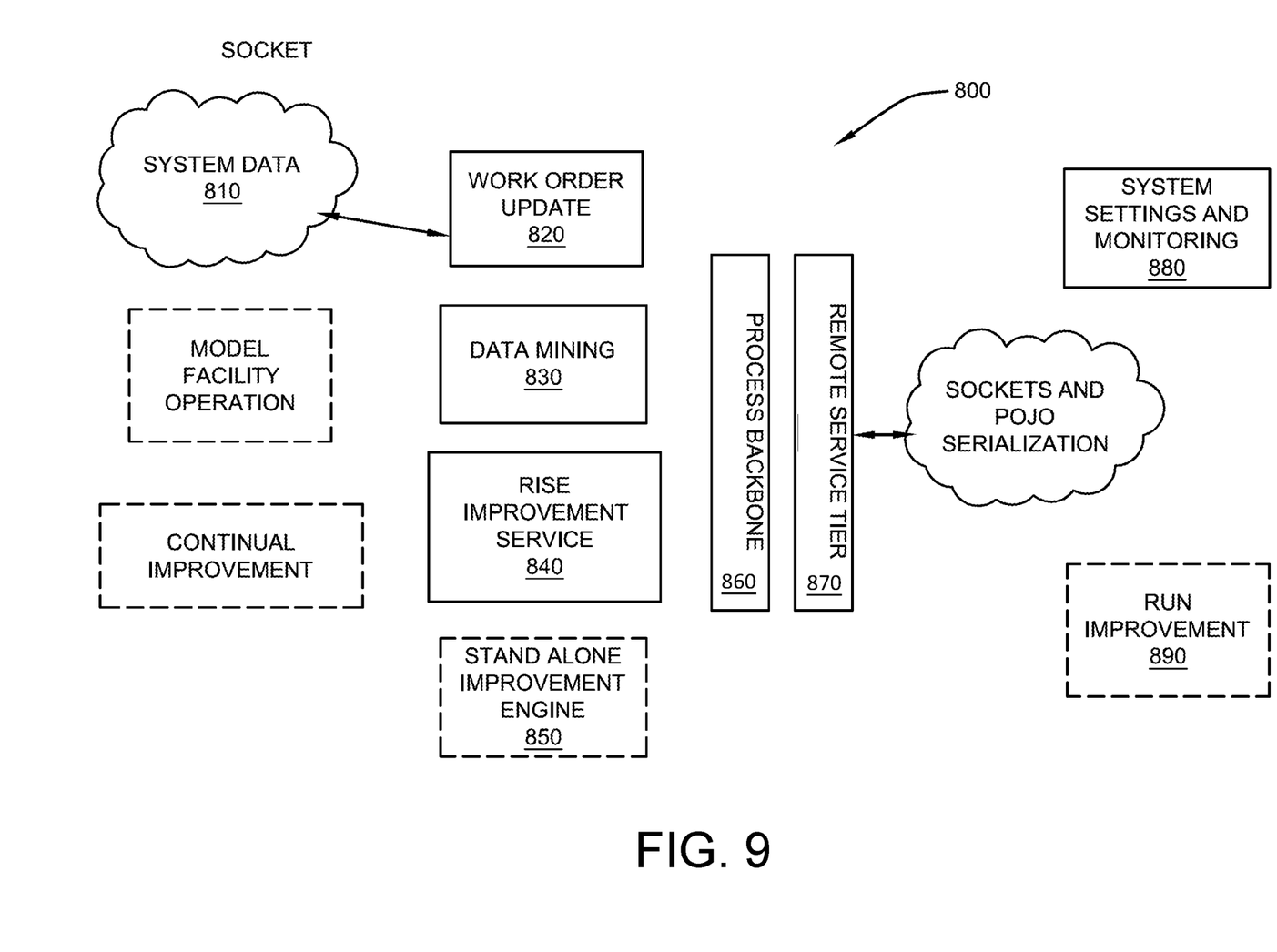
FIG. 9 is an illustration of an embodiment of a system for controlling vehicles to move material in an area.

FIG. 9 is an illustration of a system 800 for managing transports of assets within a distribution center. The system can be an embodiment of an architecture that includes a system data (e.g., information data from the distribution center, among others), control request updates 820, data mining 830, improvement services 840 (e.g., RISE improvement service, among others), standalone improvement engine 850, model facility operation, continual improvement, process backbone 860, remote service tier 870, sockets and POJO (Plain Old Java Object) serialization, system settings and monitoring 880, and run improvement 890.

The aforementioned systems, components, (e.g., system controller, control plan, control requests/work orders, among others), and the like have been described with respect to interaction between several components and/or elements. Such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 10:
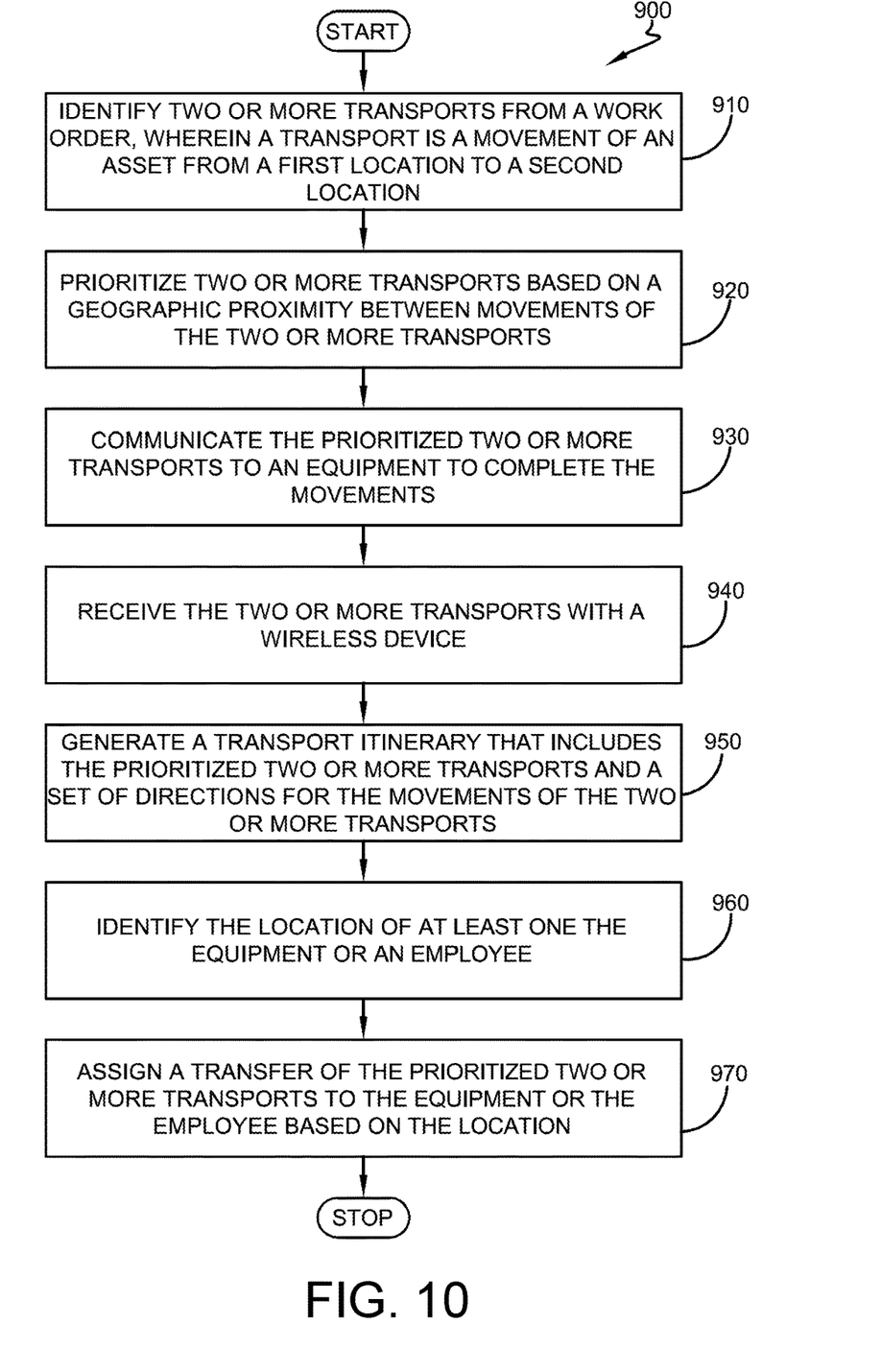
FIG. 10 illustrates a flow chart of an embodiment of a method for controlling vehicles to move material.

In view of the exemplary devices and elements described supra, methodologies that may be implemented in accordance with the disclosed subject matter will be better appreciated with reference to the flow chart of FIG. 10. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 10 illustrates a method 900 for distributing transports to reduce travel time and/or travel distance for the movement of assets within a distribution center. At reference numeral 910, two or more transports from a work order can be identified, wherein a transport is a movement of an asset from a first location to a second location. At reference numeral 920, the two or more transports can be prioritized based on a geographic proximity between movements of the two or more transports. At reference numeral 930, the prioritized two or more transports can be communicated to equipment to complete the movements.

At reference numeral 940, the prioritized two or more transports can be received with a wireless device. At reference numeral 950, a transport itinerary that includes the prioritized two or more transports and a set of directions for the movements can be generated for the two or more transports. At reference numeral 960, a location of at least one of the equipment or a worker can be identified. At reference numeral 970, a transfer of the prioritized two or more transports can be assigned to the equipment or the worker based on the location. (FIG. 10 references an "employee", but more generally, the method is applicable to workers and equipment such as vehicles.)

The method can further include calculating a total distance traveled for the two or more transports based on the location of the equipment (e.g., vehicle) or the worker. The method further includes assigning a transfer of the prioritized two or more transports to equipment or a worker based on a location of each, wherein the distribution is based on a lowest total distance traveled. The method further includes identifying a real time geographic location for at least one of the equipment or the worker. The method further includes communicating an additional transport to the equipment or the worker while the equipment or the worker location is between the first location and the second location. The method further includes clearing the work order based on completion of the movement for the two or more transports. The method further includes prioritizing the two or more transports based on at least one of an amount of traffic in a location or a load capacity of the equipment. The method further includes prioritizing the two or more transports based on an area specific event. The area specific event can be at least one of an inoperable equipment, an unavailable worker, a construction of an area, a repair to an area, a power outage for the area, a repair to equipment, an emergency event in the area, or a hazardous condition. The method further includes prioritizing one or more of the transports into a hold itinerary based on the movement of the transport being proximate to the area specific event.

In one embodiment, the prioritizing is based on geographic proximity.

In an embodiment, a device, component, a portion of hardware, a portion of software, a processor, or a combination thereof, can provide at least the following steps: identifying two or more transports from a work order, wherein the transports comprise respective movements of assets from respective first locations to respective second locations; prioritizing the two or more transports based on a geographic proximity between the movements of the two or more transports; and communicating information of the two or more transports as prioritized to equipment to complete the movements.

In an embodiment, a system is provided that includes at least the following: means for defining two or more transports (e.g., via a work order, a device that creates a work order, a transport manager that creates a work order, a computer, a processor, among others), wherein the transports comprise respective movements of assets from respective first locations in a distribution center to respective second locations in the distribution center; means for receiving a geographic location of at least one of a worker or equipment from a device (e.g., via a transport manager, via an asset location component, via a transport itinerary, among others), and to create a transport itinerary that combines at least two of the two or more transports based on an amount of distance traveled for each asset of each transport from the geographic location of the worker or the equipment (e.g., via a transport manager, via an asset location component, via a transport itinerary, among others); and means for communicating the transport itinerary to the device (e.g., via transport manager, a computer, a processor, among others).

In an embodiment, a vehicle control system includes a first controller having at least one first processor, a first communication unit operatively coupled with the first controller, a second controller on board a vehicle (which is remote from the first controller and first communication unit) and having at least one second processor, and a second communication unit on board the vehicle and operatively coupled with the second controller. The first communication unit and the second communication unit are configured to wirelessly communicate with one another. The second controller is configured to generate first control signals for controlling one or more systems on board the vehicle based at least in part on second control signals that are received by the second communication unit from the first communication unit. The first controller is configured to receive proximity signals relating to a geographic proximity between two or more designated transports. The transports comprise respective movements of material from respective first locations to respective second locations. The first controller is further configured to generate a control plan for the two or more transports based at least in part on the proximity signals, and to generate the second control signals, for communication to the second controller for controlling completion of the two or more transports, based on the control plan that is generated.

In another embodiment, the first controller is configured to generate the control plan for prioritized completion of one of the two or more transports relative to others of the two or more transports.

In another embodiment, the first controller is configured to generate the control plan for prioritized completion of one of the two or more transports relative to others of the two or more transports. Also, the first controller is configured to generate the control plan for the prioritized completion of said one of the two or more transports based upon distances associated with the movements of the transports and a geographic location of the vehicle.

In another embodiment, the first controller is configured to generate the control plan for prioritized completion of one of the two or more transports relative to others of the two or more transports. Also, the first controller is configured to generate the control plan for the prioritized completion of said one of the two or more transports based upon distances associated with the movements of the transports and a geographic location of the vehicle, and to minimize or reduce at least one of a distance or time of travel of the vehicle to complete said one of the two or more transports relative to completing said one of the two or more transports without the control plan.

In another embodiment, the first controller is configured to generate the control plan for prioritized completion of one of the two or more transports relative to others of the two or more transports, based at least in part on respective start locations of said two or more transports and a geographic location of the vehicle.

In another embodiment, the system further includes at least one sensor 58 (see FIG. 1) associated with an area of the two or more designated transports and configured to generate sensor signals 60 relating to one or more area-specific events of the area. The first controller is configured to generate the control plan further based on the sensor signals received from the at least one sensor.

In another embodiment, the system further includes at least one sensor associated with an area of the two or more designated transports and configured to generate sensor signals relating to one or more area-specific events of the area. The first controller is configured to generate the control plan for prioritized completion of one of the two or more transports relative to others of the two or more transports based on the proximity signals and the sensor signals.

In another embodiment, the one or more systems on board the vehicle that are controlled with the first control signals include a traction system of the vehicle. The first control signals are configured to control the traction system for movement of the vehicle to carry out the two or more transports.

With reference to the drawings, like reference numerals designate identical or corresponding parts throughout the several views. However, the inclusion of like elements in different views does not mean a given embodiment necessarily includes such elements or that all embodiments of the invention include such elements.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, any use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method comprising:
   determining, via a controller having one or more processors, geographic characteristics of designated transports, each of the designated transports comprises an assigned movement of material from a respective start location to a respective end location, the geographic characteristics including at least the start locations and the end locations of the designated transports;
   generating a control plan based at least in part on the geographic characteristics, wherein the control plan assigns at least first and second transports of the designated transports to a first vehicle and an assigned order at which the first vehicle is to perform the at least first and second transports, wherein the assigned order is assigned to reduce at least one of total travel distance or total travel time of the first vehicle to complete the at least first and second transports relative to the first vehicle completing the at least first and second transports in a different order, the assigned order also assigned based on a proximity between the end location of the first transport and the start location of the second transport, the second transport performed subsequent to the first transport according to the assigned order; and
   communicating, via a communication device, one or both of the control plan to the first vehicle or control signals based on the control plan to the first vehicle for controlling the first vehicle to complete the at least first and second transports according to the control plan.

2. The method of claim 1, further comprising:
   determining a location of each of multiple vehicles including the first vehicle; and
   assigning the at least first and second transports to the first vehicle based on the location of the first vehicle being closer, than at least a second vehicle of the vehicles, to the start location of the first transport that is the first of the at least first and second transports to occur according to the assigned order.

3. The method of claim 1, further comprising receiving the designated transports in at least one work order, and the control plan is generated such that the assigned order differs from a chronological sequence at which information describing the designated transports is listed in the at least one work order.

4. The method of claim 1, wherein the proximity between the end location of the first transport and the start location of the second transport is determined via a data structure stored in a memory device communicatively connected to the controller.

5. The method of claim 1, further comprising:
   calculating a total distance to be traveled by the first vehicle to complete the at least first and second transports starting from a current location of the first vehicle for each of multiple different candidate sequences of the at least first and second transports,
   wherein the assigned order in the control plan is determined by selecting a first candidate sequence of the multiple different candidate sequences that yields a lowest total distance traveled by the first vehicle.

6. The method of claim 1, further comprising assigning the at least first and second transports to the first vehicle based on one or more of a type of the first vehicle, a type of the material to be moved in each of the at least first and second transports, an amount of the material to be moved in each of the at least first and second transports, or a health of the first vehicle.

7. The method of claim 1, wherein the geographic characteristics of the designated transports are determined, at least in part, based on proximity signals generated by one or more sensors.

8. The method of claim 1, wherein the control signals based on the control plan are configured to control one or more of engine output of the first vehicle, motor output of the first vehicle, or steering of the first vehicle to cause the first vehicle to move according to the control plan.

9. The method of claim 1, wherein the start location of one or more of the designated transports is a pickup location at which the material is loaded, and the end location of the one or more designated transports is a drop off location at which the material is unloaded.

10. The method of claim 1, further comprising determining a current location of the first vehicle, wherein generating the control plan comprises assigning the assigned order such that the first vehicle performs the first transport before the second transport based on the current location of the first vehicle being closer to the start location of the first transport than to the start location of the second transport.

11. A vehicle control system comprising:
    a controller including one or more processors and configured to determine geographic characteristics of designated transports, each of the designated transports comprises an assigned movement of material from a respective start location to a respective end location, the geographic characteristics including at least the start locations and the end locations of the designated transports,
    wherein the controller is configured to generate a control plan based at least in part on the geographic characteristics, the control plan assigning at least first and second transports of the designated transports to a first vehicle and an assigned order at which the first vehicle is to perform the at least first and second transports, wherein the controller is configured to assign the assigned order to reduce at least one of total travel distance or total travel time of the first vehicle to complete the at least first and second transports relative to the first vehicle completing the at least first and second transports in a different order, the controller configured to also assign the assigned order based on a proximity between the end location of the first transport and the start location of the second transport, the second transport performed subsequent to the first transport according to the assigned order; and a communication device operatively coupled with the controller and configured to wirelessly communicate one or both of the control plan or control signals based on the control plan to the first vehicle for controlling the first vehicle to complete the at least first and second transports according to the control plan.

12. The vehicle control system of claim 11, wherein the controller is configured to determine a location of each of multiple vehicles including the first vehicle and to assign the at least first and second transports to the first vehicle based on the location of the first vehicle being closer than at least a second vehicle of the vehicles, to the start location of the first transport, which is the first of the at least first and second transports to occur according to the assigned order.

13. The vehicle control system of claim 11, wherein the controller is configured to calculate a total distance to be traveled by the first vehicle to complete the at least first and second transports starting from a current location of the first vehicle for each of multiple different candidate sequences of the at least first and second transports, and the controller is configured to assign the assigned order in the control plan by selecting a first candidate sequence of the multiple different candidate sequences that yields a lowest total distance traveled by the first vehicle.

14. The vehicle control system of claim 11, wherein the controller is configured to assign the at least first and second transports to the first vehicle based on one or more of a type of the first vehicle, a type of the material to be moved in each of the at least first and second transports, an amount of the material to be moved in each of the at least first and second transports, or a health of the first vehicle.

15. The vehicle control system of claim 11, further comprising a second controller and a second communication device both configured to be disposed onboard the first vehicle, the second controller configured to be operatively connected to the second communication device, wherein the second communication device is configured to receive one or both of the control plan or the control signals from the communication device, and the second controller is configured to control at least a traction system of the first vehicle based on one or both of the control plan or the control signals for movement of the first vehicle to perform the at least first and second transports.

16. The vehicle control system of claim 11, wherein the controller and the communication device are configured to be disposed remote from the first vehicle.

17. A method comprising:
determining, via a controller having one or more processors, geographic characteristics of designated transports, each of the designated transports comprises an assigned movement of material from a respective start location to a respective end location, the geographic characteristics including at least the start locations and the end locations of the designated transports;

determining respective locations of multiple vehicles in an area; and generating a control plan based at least in part on the geographic characteristics and the respective locations of the vehicles, wherein generating the control plan comprises assigning at least first and second transports of the designated transports to a first vehicle of the vehicles and assigning an assigned order at which the vehicle is to perform the at least first and second transports, wherein the first vehicle is assigned based on the respective location of the first vehicle being closer than at least a second vehicle of the vehicles to the start location of the first transport, and the assigned order is assigned to reduce at least one of total travel distance or total travel time of the first vehicle to complete the at least first and second transports relative to the first vehicle completing the at least first and second transports in a different order.

18. The method of claim 17, further comprising communicating, via a communication device, one or both of the control plan to the first vehicle or control signals based on the control plan to the first vehicle for controlling the first vehicle to complete the at least first and second transports according to the control plan.

19. The method of claim 17, further comprising:
calculating a total distance to be traveled by the first vehicle to complete the at least first and second transports starting from the respective location of the first vehicle for each of multiple different candidate sequences of the at least first and second transports, wherein the assigned order at which the vehicle is to perform the at least first and second transports is assigned by selecting a first candidate sequence of the multiple different candidate sequences that yields a lowest total distance traveled by the first vehicle.

20. The method of claim 17, wherein the area is a distribution center.

* * * * *